(No Model.)
L. M. STEVENS.
DOUBLETREE.
No. 586,462. Patented July 13, 1897.
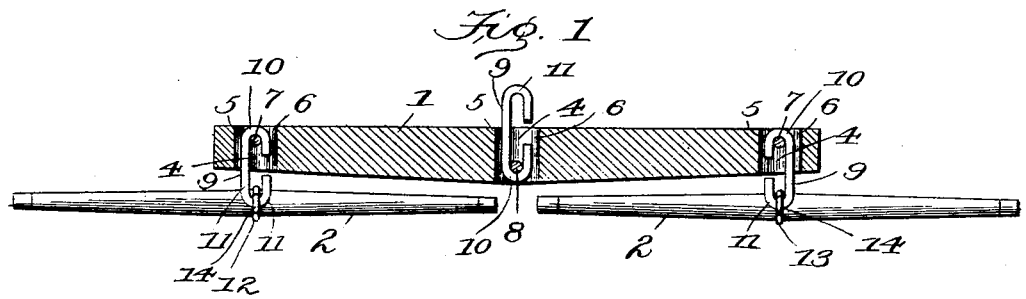
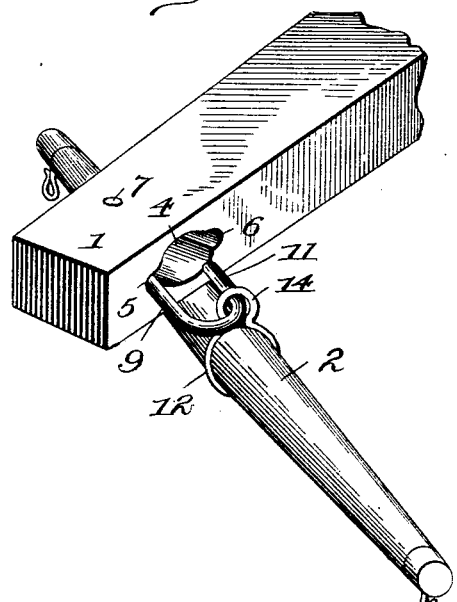
WITNESSES:
Edwin L. Bradford
Alex. J. Wedderburn Jr.
INVENTOR
Laurence M. Stevens
BY John Wedderburn
ATTORNEY.

UNITED STATES PATENT OFFICE.

LAWRENCE M. STEVENS, OF SHAW, MISSISSIPPI.

DOUBLETREE.

SPECIFICATION forming part of Letters Patent No. 586,462, dated July 13, 1897.

Application filed November 23, 1896. Serial No. 613,129. (No model.)

*To all whom it may concern:*

Be it known that I, LAWRENCE M. STEVENS, a citizen of the United States, residing at Shaw, in the county of Bolivar and State of Mississippi, have invented certain new and useful Improvements in Doubletrees; and I do hereby declare the following to be a full, clear, and exact description of the invention, such as will enable others skilled in the art to which it appertains to make and use the same.

My invention relates to doubletrees.

My object is to provide a novel form of detachable connection adapted to fasten the singletree to the doubletree.

Having this object in view, the invention consists of a connection comprising certain novel features and combinations appearing more fully hereinafter.

In the accompanying drawings, Figure 1 is a horizontal section, and Fig. 2 a perspective view showing the parts in position immediately prior to the detachment of a singletree.

The numeral 1 designates a doubletree, and 2 and 3 singletrees. Openings 4 are made in the doubletree from front to rear thereof, and each opening is made with two sets of diametrically opposite longitudinally-extending grooves 5 and 6.

The numerals 7 designate bolts which pass vertically through the openings near the rear of the doubletree, and 8 designates a center bolt near the front of the doubletree.

Each improved hook is designated by the numeral 9, and it is formed with the two inwardly-extending hooked portions 10 and 11. The hooked ends 10 straddle the bolt loosely, while the hooked portions 11 project out in front of the doubletree. The whole hook is adapted to slide back and forth through the opening and the grooves 5. Shackles 12 and 13 encircle the singletree, and each is provided with an eye 14, which is adapted to lock with the outer hooked portion 11. The intermediate double hook secures the doubletree to the vehicle.

Ordinarily when the animals back the hooked ends 11 slide into the openings and prevent disconnection of the eyes of the shackles.

When it is desirable to unhook the singletrees, this is accomplished by manipulating them and the hooks, as shown in Fig. 2—that is, having the hooked portion 11 extended and drawn toward the end of the doubletree and the singletrees twisted substantially at right angles to said doubletree.

Having thus described my invention, what I claim as new, and desire to secure by Letters Patent, is—

1. The combination with a doubletree having an opening therein, of a bolt passing through said opening, a hook which straddles the bolt, being adapted to slide in the opening, and a singletree connected to the hook.

2. The combination with a doubletree having a horizontally-extending opening made therethrough, of a bolt fastened in said opening, a double hook slidable in the opening and having one portion straddling and engaging with the bolt, and a singletree having a shackle interlocked with the other hooked portion of the double hook.

In testimony whereof I have signed this specification in the presence of two subscribing witnesses.

LAWRENCE M. STEVENS.

Witnesses:
C. B. HILL,
A. C. CRAIG.